United States Patent [19]

Hatori

[11] Patent Number: 5,757,984
[45] Date of Patent: May 26, 1998

[54] ELECTRO-OPTIC OPTICAL MODULATING APPARATUS

[75] Inventor: Masami Hatori, Kanagawa-Ken, Japan

[73] Assignee: Fuji Photo Film Co., Ltd., Kanagawa, Japan

[21] Appl. No.: 427,195

[22] Filed: Apr. 24, 1995

[30] Foreign Application Priority Data

Apr. 25, 1994 [JP] Japan ................. 6-086223

[51] Int. Cl.[6] ........................................ G02F 1/035
[52] U.S. Cl. ........................ 385/2; 385/8; 385/10; 385/1; 385/40
[58] Field of Search .................... 385/1–10, 21, 385/23, 31, 40; 359/181, 182

[56] References Cited

U.S. PATENT DOCUMENTS

| 3,877,782 | 4/1975 | Kaminow | 385/16 X |
|---|---|---|---|
| 4,645,293 | 2/1987 | Yoshida et al. | 385/2 X |
| 4,936,645 | 6/1990 | Yoon et al. | 385/45 X |
| 5,005,932 | 4/1991 | Schaffner et al. | 385/3 |
| 5,208,817 | 5/1993 | Kao et al. | 385/2 |
| 5,359,449 | 10/1994 | Nishimoto et al. | 385/2 X |
| 5,438,637 | 8/1995 | Nilsson et al. | 385/10 |
| 5,455,876 | 10/1995 | Hopfer et al. | 385/2 |
| 5,566,258 | 10/1996 | Hatori et al. | 385/8 |

FOREIGN PATENT DOCUMENTS 2000931 1/1990 Japan ................. G02F 1/335

OTHER PUBLICATIONS

Japanese Journal of Applied Physics, vol. 20, No. 4, Apr. 1981 pp. 733–737.

*Primary Examiner*—Phan T. H. Palmer
*Attorney, Agent, or Firm*—Sughrue, Mion, Zinn, Macpeak & Seas, PLLC

[57] ABSTRACT

An electro-optic optical modulating apparatus comprises an optical waveguide, which has electro-optic effects, and at least a single pair of electrodes, which are located in the vicinity of the optical waveguide. A driving circuit applies a radio-frequency voltage across the electrodes. A modulating circuit modulates the amplitude of the radio-frequency voltage in accordance with a predetermined signal. The amount of a modulated optical wave is thus prevented from fluctuating due to a DC drift phenomenon.

5 Claims, 7 Drawing Sheets

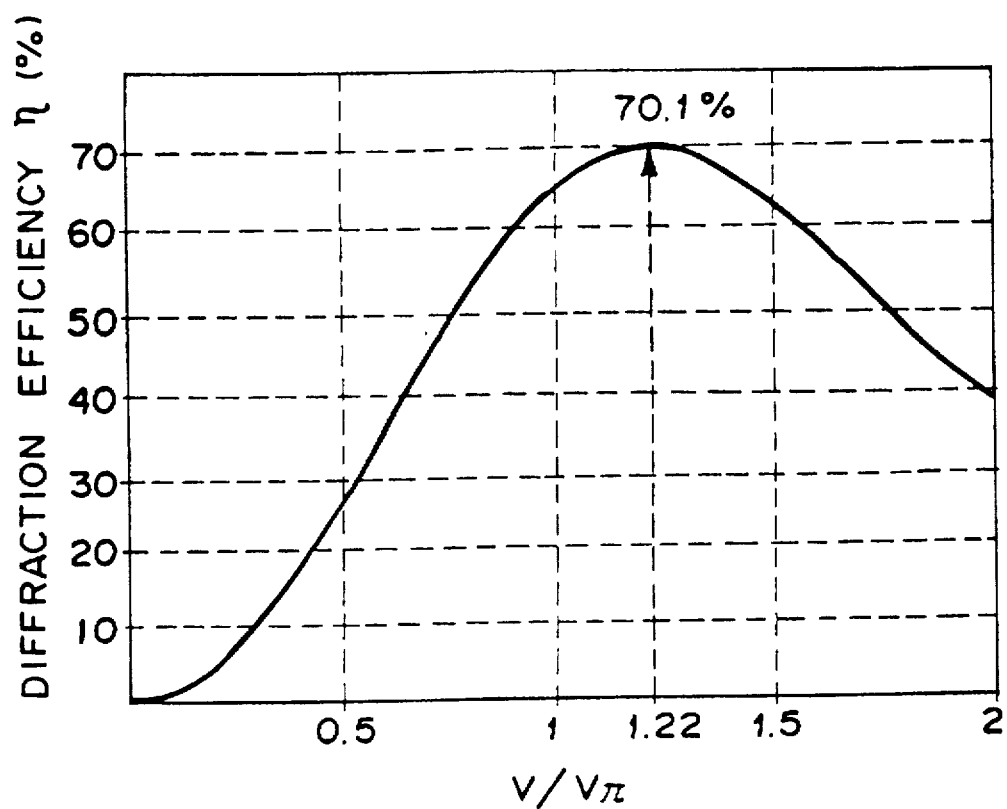

ELECTRO-OPTIC OPTICAL MODULATING APPARATUS

BACKGROUND OF THE INVENTION

1. Field of the Invention

This invention relates to an electro-optic optical modulating apparatus. This invention particularly relates to an electro-optic optical modulating apparatus comprising an optical waveguide, which has electro-optic effects, at least a single pair of electrodes, which are located in the vicinity of the optical waveguide, and a driving circuit for applying a voltage across the electrodes, wherein a guided optical wave, which is guided through the optical waveguide, is modulated in accordance with the condition, under which the voltage is applied across the electrodes.

2. Description of the Prior Art

Optical scanning recording apparatuses have heretofore been used wherein a light beam, which serves as recording light, is modulated in accordance with an image signal, a recording material (such as a photosensitive material) is scanned with the modulated light beam in a main scanning direction and in a sub-scanning direction, and an image represented by the image signal is thereby recorded on the recording material.

In the aforesaid types of optical scanning recording apparatuses, it is necessary that the light beam be modulated in accordance with the image signal. For such purposes, it has been proposed to utilize an optical waveguide type of electro-optic device as disclosed in, for example, Japanese Unexamined Patent Publication No. 2(1990)-931. The disclosed optical waveguide type of electro-optic device comprises an optical waveguide having electro-optic effects, grating-shaped electrodes (hereinafter referred to as the "EOG electrodes") located on the optical waveguide so as to form an electro-optic grating in the optical waveguide, and a driving circuit for applying a voltage across the EOG electrodes. A guided optical wave, which is guided through the optical waveguide, is thereby selectively diffracted in accordance with the condition, under which the voltage is applied across the EOG electrodes.

In cases where the optical waveguide type of electro-optic device is used, either one of a diffracted optical wave and an undiffracted optical wave (i.e. a zero-order optical wave) can be utilized as the scanning optical wave (i.e. the scanning light beam), and the scanning optical wave can be modulated in accordance with whether it is or is not diffracted or in accordance with the extent of diffraction.

Also, a different optical waveguide type of electro-optic device is proposed in, for example, Japanese Journal of Applied Physics, Vol. 20, No. 4, April 1981, pp. 733–737. The proposed optical waveguide type of electro-optic device comprises a substrate, which has an electro-optic effect, two channel optical waveguides, which constitute a directional coupler and are formed on the substrate, and flat plate-shaped electrodes respectively located on the channel optical waveguides, wherein a guided optical wave, which is guided through one of the channel optical waveguides, is selectively transferred to the other channel optical waveguide in accordance with a voltage which is applied across the electrodes.

With the proposed optical waveguide type of electro-optic device, the optical wave, which is radiated out of the other channel optical waveguide, can be utilized, and the utilized optical wave can be modulated in accordance with the voltage which is applied across the electrodes.

Ordinarily, in the aforesaid optical waveguide types of electro-optic devices, it is necessary that a buffer layer, which may be constituted of $SiO_2$, $Al_2O_3$, or the like, is located between the electrodes and the optical waveguide in order to prevent the guided optical wave from being scattered or absorbed by the electrodes.

However, it has been found that, in the optical waveguide types of electro-optic devices provided with the buffer layers, the so-called "DC drift phenomenon" occurs easily. Specifically, the applied voltage vs. diffraction efficiency characteristics easily fluctuate during the application of the voltage across the electrodes.

If the optical waveguide type of electro-optic device is utilized in an optical modulating apparatus and the DC drift phenomenon occurs in the optical waveguide type of electro-optic device, the amount of the modulated optical wave will fluctuate. Therefore, problems will occur. For example, the image density of an image, which is recorded with the modulated optical wave, fluctuates. Particularly, in cases where a high gradation image is to be recorded by continuously modulating the intensity of the scanning optical wave, if the amount of the modulated optical wave fluctuates, the reproducibility of the image density of the recorded image will become markedly low.

SUMMARY OF THE INVENTION

The primary object of the present invention is to provide an electro-optic optical modulating apparatus, wherein the amount of modulation of the optical wave is prevented from fluctuating due to the DC drift phenomenon.

Another object of the present invention is to provide an electro-optic optical modulating apparatus, with which the reproducibility of the image density of a recorded image is kept high.

The present invention provides an electro-optic optical modulating apparatus comprising:

i) an optical waveguide, which has electro-optic effects, ii) at least a single pair of electrodes, which are located in the vicinity of the optical waveguide, iii) a driving circuit, which applies a radio-frequency voltage across the electrodes, and iv) a modulating circuit, which modulates the amplitude of the radio-frequency voltage in accordance with a predetermined signal.

Effects of the electro-optic optical modulating apparatus in accordance with the present invention will be described hereinbelow by taking the optical waveguide type of electro-optic device provided with EOG electrodes as an example. If no DC drift phenomenon occurs with the optical waveguide type of electro-optic device, the relationship between a drive voltage V, which is applied across the EOG electrodes, and a diffraction efficiency η will be expressed as $$\eta = \sin^2 AV$$

wherein A represents a fixed number. FIG. 10 is an explanatory graph showing a DC drift phenomenon. In FIG. 10, curve "a" indicates the aforesaid relationship.

Therefore, when the applied voltage V is equal to zero, the diffraction efficiency η is also equal to zero. On this assumption, control of the drive voltage for modulation of the optical wave is carried out. Specifically, for example, in cases where the diffracted optical wave is subjected to on-off modulation, the applied voltage V is ordinarily set at zero in order to set the amount of the modulation of the optical wave at zero, and the applied voltage V is set at Vπ in order to set the amount of the modulation of the optical wave at the maximum value, which is obtained with the maximum diffraction efficiency ηmax.

However, as illustrated in FIG. 10, if the DC drift phenomenon occurs, the applied voltage vs. diffraction efficiency characteristics will shift rightwardly along the horizontal axis direction and will change to the characteristics indicated by curve "b." In such cases, even if the applied voltage V is set at zero, the diffraction efficiency η will not become zero and will take the value of η1. Also, when the applied voltage V is set at VΠ, the diffraction efficiency η will take the value of η2, which is not much different from the value of η1. Therefore, the desired on-off modulation cannot be carried out.

The aforementioned shift of the applied voltage vs. diffraction efficiency characteristics occurs comparatively slowly. Also, the direction, along which the applied voltage vs. diffraction efficiency characteristics shift, changes in accordance with the polarity of the applied voltage.

Therefore, with the electro-optic optical modulating apparatus in accordance with the present invention, the radio-frequency voltage is applied across the electrodes. As a result, the polarity of the applied voltage is reversed with a short period (which is one half of the period of the radio-frequency voltage). Therefore, with reference to FIG. 10, after the characteristics indicated by curve "a" shift very slightly in the rightward direction, the characteristics shift leftwardly. After the characteristics thus shift very slightly in the leftward direction, the characteristics shift rightwardly. Such shifting operations are repeated.

Accordingly, the diffraction of the optical wave is carried out under the applied voltage vs. diffraction efficiency characteristics indicated by curve "a" or under characteristics very close to curve "a". In this manner, the adverse effects of the DC drift phenomenon can be eliminated.

When the amplitude of the radio-frequency voltage is modulated in accordance with a predetermined signal, the diffraction efficiency η changes in accordance with the predetermined signal. Therefore, the diffracted optical wave or the undiffracted optical wave (i.e. the zero-order optical wave) can be modulated. In cases where the amplitude of the radio-frequency voltage is modulated continuously, the intensity of the optical wave, which is to be modulated, can be modulated continuously. In cases where the amplitude of the radio-frequency voltage is modulated such that the radio-frequency voltage may take either one of zero amplitude and a predetermined amplitude, the on-off modulation of the optical wave, which is to be modulated, can be carried out.

The electro-optic optical modulating apparatus in accordance with the present invention, which is provided with the EOG electrodes, has the effects described above. In cases where the electro-optic optical modulating apparatus in accordance with the present invention is provided with the flat plate-shaped electrodes, the adverse effects of the DC drift phenomenon can be eliminated in the same manner as that described above.

BRIEF DESCRIPTION OF THE DRAWINGS

FIG. 6 is a graph showing the relationship between a voltage applied across electrodes and a diffraction efficiency.

DESCRIPTION OF THE PREFERRED EMBODIMENTS

The present invention will hereinbelow be described in further detail with reference to the accompanying drawings.

Figure 1:
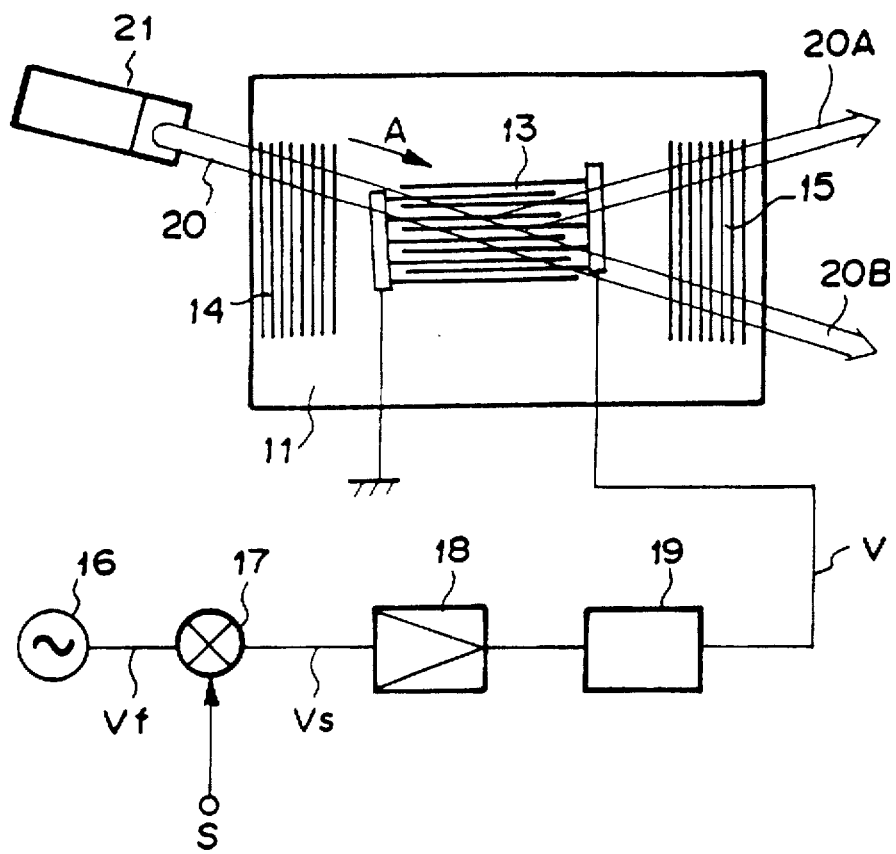
FIG. 1 is a plan view showing a first embodiment of the electro-optic optical modulating apparatus in accordance with the present invention.
Figure 2:
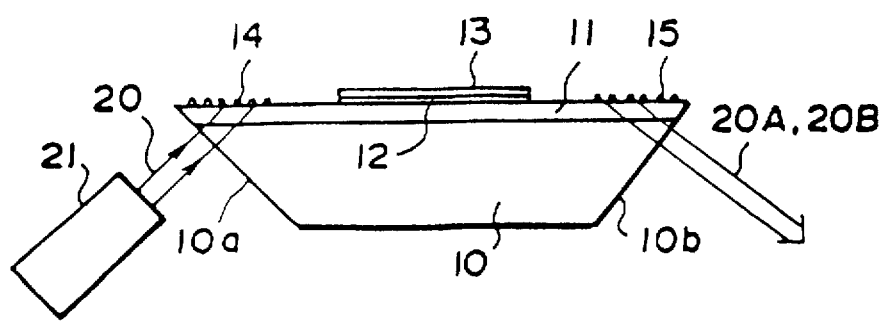
FIG. 2 is a side view showing the embodiment of FIG. 1.

FIG. 1 is a plan view showing a first embodiment of the electro-optic optical modulating apparatus in accordance with the present invention. FIG. 2 is a side view showing the embodiment of FIG. 1.

As illustrated in FIGS. 1 and 2, the electro-optic optical modulating apparatus comprises an MgO-doped LiNbO$_3$ substrate 10, and a thin-film optical waveguide 11, which is formed with a proton exchange process on the LiNbO$_3$ substrate 10. The electro-optic optical modulating apparatus also comprises a buffer layer 12, which is constituted of an SiO$_2$ film and which is overlaid on the optical waveguide 11, and EOG electrodes 13, which are located on the buffer layer 12. The electro-optic optical modulating apparatus further comprises a linear grating coupler (hereinafter referred to as the "LGC") 14 for entry of the optical wave and an LGC 15 for radiation of the optical wave. The LGC 14 and the LGC 15 are located on the surface of the optical waveguide 11. The LGC 14 and the LGC 15 are spaced apart from each other with the EOG electrodes 13 intervening therebetween. The electro-optic optical modulating apparatus further comprises a driving circuit, which applies a voltage across the EOG electrodes 13 and which is constituted of a generator 16, an amplifier 18, and an impedance matching circuit 19.

A laser beam source 21 produces an optical wave 20, which is to be modulated. The laser beam source 21 is located such that the optical wave 20 in the form of a collimated beam may pass through an obliquely cut end face 10a of the substrate 10. The optical wave 20 then passes through the optical waveguide 11 and impinges upon the LGC 14. Thereafter, the optical wave 20 is diffracted by the LGC 14, enters into the optical waveguide 11, and travels through the optical waveguide 11 in the guided mode along the direction indicated by the arrow A.

The optical wave 20 (which is now the guided optical wave) is guided through the portion of the optical waveguide 11 corresponding to the position of the EOG electrodes 13. When no voltage is applied across the EOG electrodes 13, the guided optical wave 20 travels straight ahead as an undiffracted optical wave 20B. When a voltage is applied by the driving circuit across the EOG electrodes 13, the refractive index of the optical waveguide 11 having the electro-optic effects changes, and a grating is thereby formed in the optical waveguide 11. The guided optical wave 20 is diffracted as the diffracted optical wave 20A by the grating. The diffracted optical wave 20A or the undiffracted optical wave 20B is diffracted at the position of the LGC 15 towards the substrate 10. Thereafter, the optical wave 20A or the optical wave 20B is radiated out of the electro-optic optical modulating apparatus from an obliquely cut end face 10b of the substrate 10.

Figure 10:
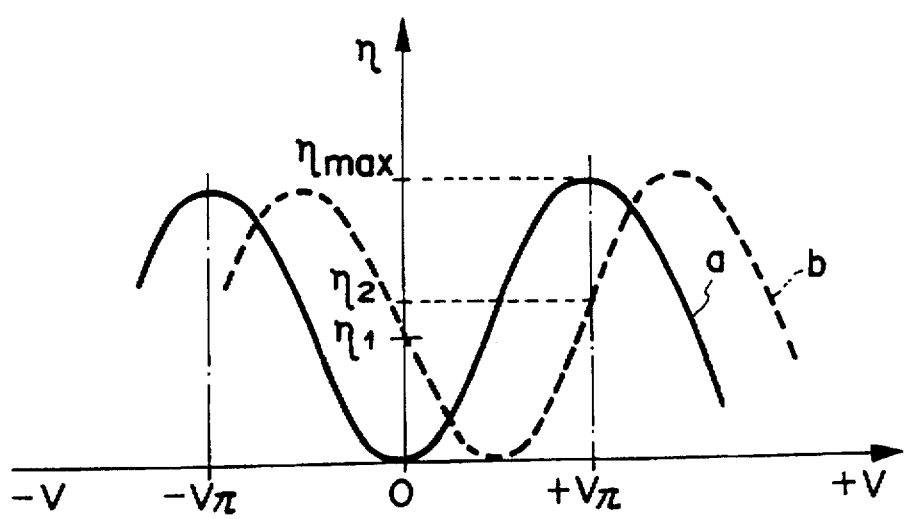
FIG. 10 is an explanatory graph showing a DC drift phenomenon.

As illustrated in FIG. 10, the diffraction efficiency η changes in accordance with the value of the voltage V applied across the EOG electrodes 13. Therefore, the intensity of the optical wave 20A, which is radiated out of the electro-optic optical modulating apparatus, can be modulated in accordance with the value of the applied voltage V. In this embodiment, instead of the intensity of the optical wave 20A being modulated continuously, the intensity of the optical wave 20A is selectively set to be either one of a predetermined level and zero. Specifically, the on-off modulation of the intensity of the optical wave 20A is carried out.

Figure 3A:
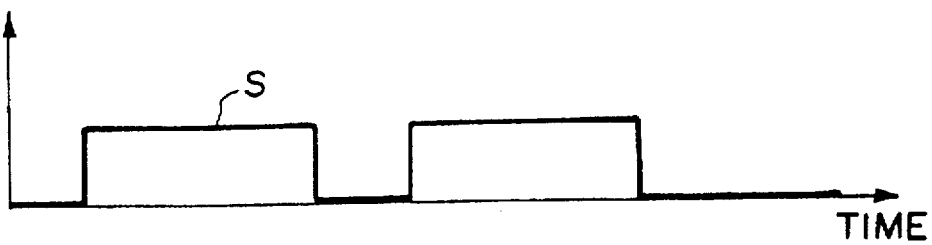
FIG. 3A is a graph showing a wave form of an image signal in the embodiment of FIG. 1.
Figure 3B:
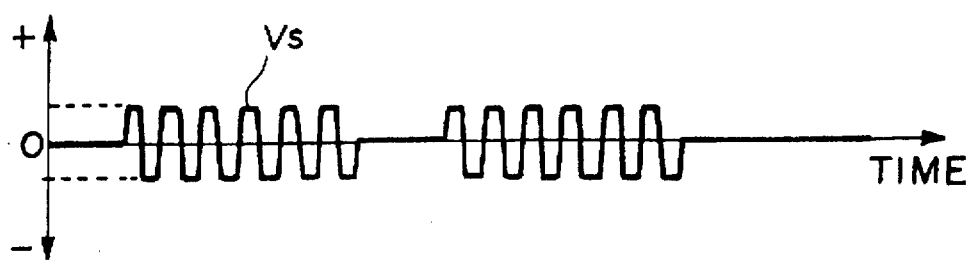
FIG. 3B is a graph showing a wave form of an applied voltage in the embodiment of FIG. 1.

How the applied voltage V is controlled so as to carry out the modulation described above will be described hereinbelow. The generator 16 generates a radio-frequency voltage Vf having a predetermined frequency. The radio-frequency voltage Vf is fed into a double balanced mixer 17. Also, an image signal, which has the rectangular wave form shown in FIG. 3A, is fed into the double balanced mixer 17. In the double balanced mixer 17, the image signal S and the radio-frequency voltage Vf are added to each other. In this manner, the amplitude of the radio-frequency voltage Vf is modulated in accordance with the image signal S, and a voltage signal Vs, which has the wave form shown in FIG. 3B, is fed out of the double balanced mixer 17.

Figure 3C:
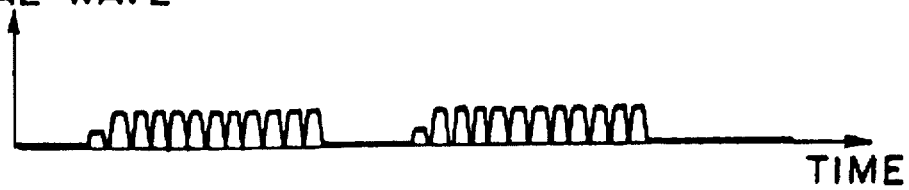
FIG. 3C is a graph showing a wave form of a modulated optical wave in the embodiment of FIG. 1.

The voltage signal Vs is amplified by the amplifier 18 and is fed as the applied voltage V out of the impedance matching circuit 19. When the voltage V is applied across the EOG electrodes 13, the diffraction efficiency η changes in accordance with the value of the applied voltage V. Therefore, the intensity of the optical wave 20A is modulated so as to have the wave form shown in FIG. 3C.

As indicated by the curve "a" in FIG. 10, the positive voltage side and the negative voltage side of the applied voltage vs. diffraction efficiency characteristics are symmetric with respect to the applied voltage V=zero. Therefore, when the applied voltage V takes a positive value and when the applied voltage V takes a negative value, if the absolute values of the positive value and the negative value are equal to each other, an identical diffraction efficiency η can be obtained. Accordingly, if the frequency of the radio-frequency voltage Vf is equal to f, the pulse frequency of the optical wave 20A will become equal to 2f.

The polarity of the applied voltage V is reversed within a short time. Therefore, for the reasons described above, the DC drift phenomenon can be restricted. In cases where the DC drift phenomenon is restricted, when the image signal S has the high level, the optical wave 20A is reliably turned on. When the image signal S has the low level, the optical wave 20A is reliably turned off.

Also, in cases where the DC drift phenomenon is restricted, the peak value of the applied voltage V and the intensity (the peak value) of the diffracted optical wave 20A always uniquely correspond to each other. Therefore, in cases where a high gradation image is recorded on a silver halide photographic material by continuously changing the signal level of the image signal S and scanning the silver halide photographic material with the optical wave 20A, which is thus obtained, the signal level of the image signal S and the intensity (the peak value) of the diffracted optical wave 20A always uniquely correspond to each other, and an image can be recorded with good density reproducibility.

In cases where the on-off modulation of the optical wave 20A is carried out as in this embodiment, it is necessary that the period of the radio-frequency voltage Vf is sufficiently shorter than the minimum on time (i.e., the time for recording the minimum dot) of the optical wave 20A. In cases where this requirement is satisfied, the pulsed optical wave 20A is repeatedly turned on and off within the on time and can be detected as an optical wave having a predetermined amount. Therefore, in such cases, no problem occurs. Specifically, the problems do not occur in that a single pulse of the optical wave 20A is cut at an intermediate point and the amount of the optical wave 20A varies in accordance with the wave form of the cut pulse.

Figure 4A:
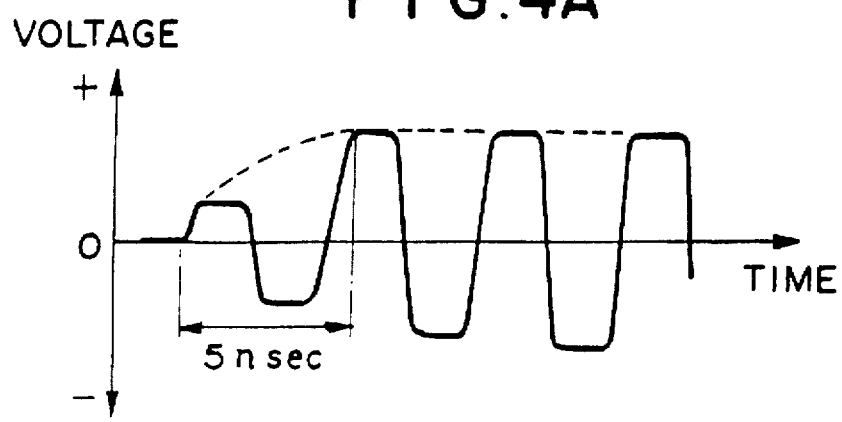
FIG. 4A is a graph showing the wave form of the applied voltage in detail.
Figure 4B:
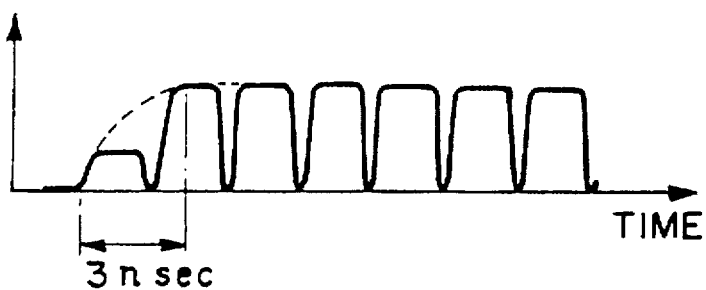
FIG. 4B is a graph showing the wave form of the modulated optical wave, which is obtained when the voltage having the wave form shown in FIG. 4A is applied, in detail.
Figure 5A:
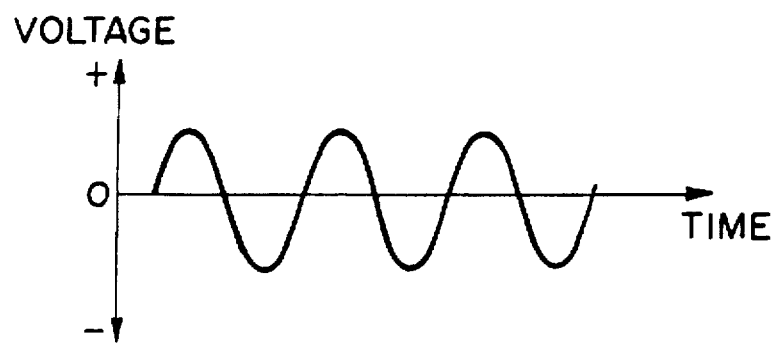
FIG. 5A is a graph showing a different example of a wave form of an applied voltage, which may be utilized in the electro-optic optical modulating apparatus in accordance with the present invention.
Figure 5B:
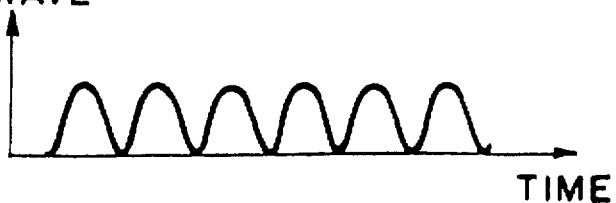
FIG. 5B is a graph showing a wave form of a modulated optical wave, which is obtained when the voltage having the wave form shown in FIG. 5A is applied.

In this embodiment, the radio-frequency voltage Vf having the rectangular wave form is utilized. FIG. 4A shows the wave form of the radio-frequency voltage Vf in detail. FIG. 4B shows the wave form of the optical wave 20A, which is obtained when the radio-frequency voltage Vf having the wave form shown in FIG. 4A is utilized, in detail. Alternatively, the radio-frequency voltage Vf may have a sine wave form, or the like. FIG. 5A shows the sine wave form of the radio-frequency voltage Vf. FIG. 5B shows the wave form of the optical wave 20A, which is obtained when the radio-frequency voltage Vf having the wave form shown in FIG. 5A is utilized.

As illustrated in FIGS. 4A, 4B and FIGS. 5A, 5B, in cases where the radio-frequency voltage Vf having the rectangular wave form is utilized, the gaps between the pulses of the optical wave 20A become smaller and a higher diffraction efficiency η can be obtained than when the radio-frequency voltage Vf having the sine wave form is utilized. Therefore, the radio-frequency voltage Vf having the rectangular wave form should preferably be utilized. By way of example, when the frequency f of the radio-frequency voltage Vf was set to be 10 MHz in the electro-optic optical modulating apparatus shown in FIGS. 1 and 2, a diffraction efficiency η of 85% was obtained with the radio-frequency voltage Vf having the rectangular wave form and having a rise time of 2 nsec, and a diffraction efficiency η of 68% was obtained with the radio-frequency voltage Vf having the sine wave form.

As illustrated in FIGS. 4A and 4B, in cases where the rectangular waves having the rise time of 2 nsec was modulated, when the rise time with the envelope of the drive voltage wave form was 5 nsec, the rise time of the pulse of the optical wave 20A was approximately 3 nsec. Thus the rise of the pulse of the optical wave 20A is quicker than the rise of the drive voltage wave form. This is because, as described above, the diffraction efficiency η has the nonlinear relationship with respect to the applied voltage V, which is represented by the formula shown below, and rises sharply.

$$\eta = \sin^2 AV$$

wherein A represents a fixed number.

FIG. 6 shows the relationship between the applied voltage V and the diffraction efficiency η obtained when the radio-frequency voltage Vf having the sine wave form is utilized. The illustrated relationship is the one obtained theoretically, and the applied voltage V is plotted along the horizontal axis as the ratio to the aforesaid applied voltage VΠ. As illustrated in FIG. 6, when the voltage V=1.22VΠ, the maximum diffraction efficiency η of 70.1% can be obtained.

Figure 7A:
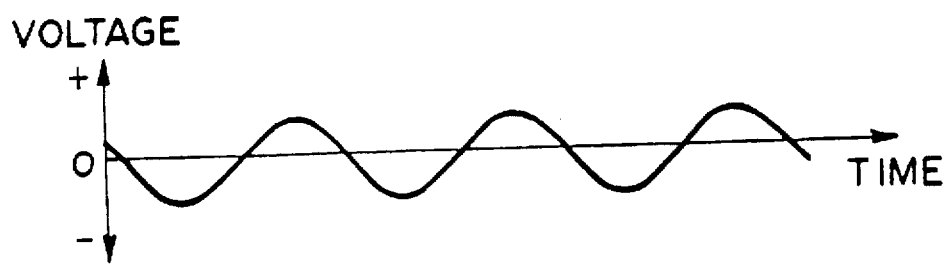
FIGS. 7A, 7B, 7C, and 7D are graphs showing different examples of wave forms of applied voltages, which may be utilized in the electro-optic optical modulating apparatus in accordance with the present invention.
Figure 7B:
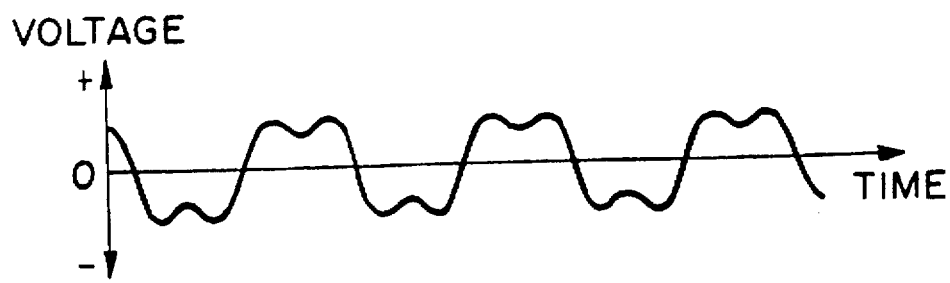
Figure 7C:
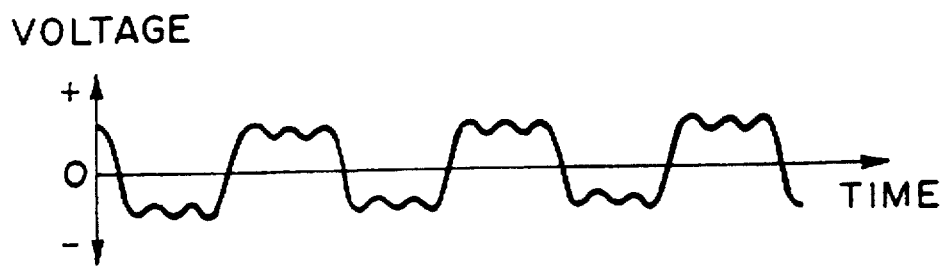
Figure 7D:
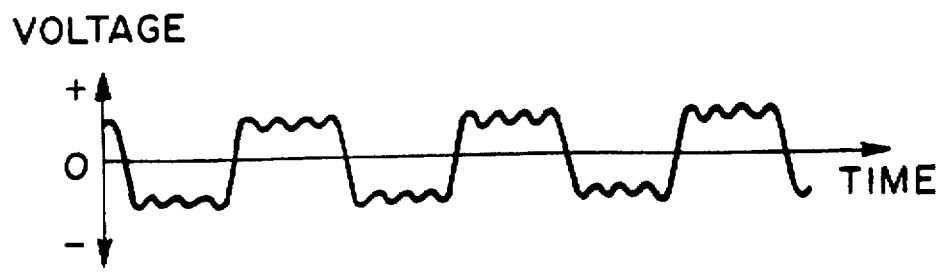

FIGS. 7A, 7B, 7C, and 7D are graphs showing different examples of wave forms of the radio-frequency voltages Vf, which may be utilized in the electro-optic optical modulating apparatus in accordance with the present invention. FIG. 7A shows the radio-frequency voltage Vf having the sine wave form. FIG. 7B shows the radio-frequency voltage Vf obtained by superposing the sine wave and its second harmonic upon each other. FIG. 7C shows the radio-frequency voltage Vf obtained by superposing the sine wave and its fifth harmonic upon each other. FIG. 7D shows the radio-frequency voltage Vf obtained by superposing the sine wave and its seventh harmonic upon each other.

In cases where the radio-frequency voltage Vf having the wave form shown in FIG. 7A is utilized, the maximum diffraction efficiency η of 70.1% can be obtained theoretically. In cases where the radio-frequency voltage Vf having the wave form shown in FIG. 7B is utilized, the maximum diffraction efficiency η of 83.9% can be obtained theoretically. In cases where the radio-frequency voltage Vf having the wave form shown in FIG. 7C is utilized, the maximum diffraction efficiency η of 89.0% can be obtained theoretically. In cases where the radio-frequency voltage Vf having the wave form shown in FIG. 7D is utilized, the maximum diffraction efficiency η of 91.7% can be obtained theoretically. In this manner, as the wave form of the radio-frequency voltage Vf becomes closer to the rectangular wave form, a higher maximum diffraction efficiency η can be obtained.

A second embodiment of the electro-optic optical modulating apparatus in accordance with the present invention will be described hereinbelow with reference to FIG. 8.

Figure 8:
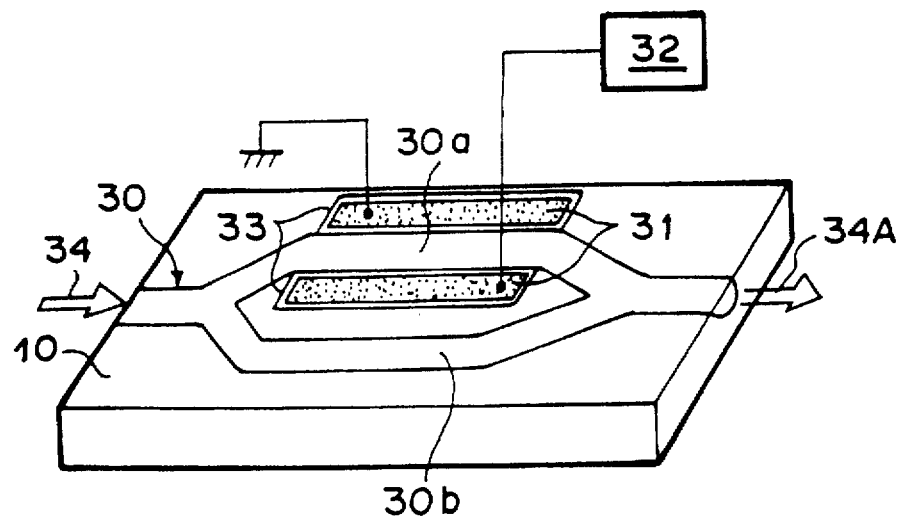
FIG. 8 is a perspective view showing a second embodiment of the electro-optic optical modulating apparatus in accordance with the present invention.

As illustrated in FIG. 8, the electro-optic optical modulating apparatus comprises an MgO-doped LiNbO₃ substrate 10 and a channel optical waveguide 30, which is formed on the LiNbO₃ substrate 10 and has a shape obtained by connecting two Y-branched optical waveguides. The electro-optic optical modulating apparatus also comprises a pair of flat plate-shaped electrodes 31, 31, which are formed on the substrate 10 so as to flank a branch portion 30a of the channel optical waveguide 30. The electro-optic optical modulating apparatus further comprises a modulation driving circuit 32, which applies a voltage across the flat plate-shaped electrodes 31, 31. A buffer layer 33, which is constituted of an SiO₂ film, is located between the flat plate-shaped electrodes 31, 31 and the substrate 10.

In the second embodiment of FIG. 8, an entry optical wave 34 enters from the left end of the channel optical waveguide 30 and is branched at the first Y-shaped branch point. The branched optical waves are guided through branch portions 30a and 30b and are then combined with each other at the second Y-shaped branch point. The combined optical wave is radiated as a radiated optical wave 34A from the right end of the channel optical waveguide 30.

When the voltage is applied across the electrodes 31, 31 and to the branch portion 30a of the channel optical waveguide 30, the refractive index of the branch portion 30a changes. Therefore, the phase of the optical wave, which is guided through the branch portion 30a, is modulated in accordance with the application of the voltage. When the optical wave, which has been guided through the branch portion 30a, and the optical wave, which has been guided through the branch portion 30b, are combined with each other, they interfere with each other. Therefore, the intensity of the radiated optical wave 34A is modulated in accordance with the application of the voltage.

In the second embodiment, basically, the modulation driving circuit 32 may be constituted of the generator 16, the double balanced mixer 17, the amplifier 18, and the impedance matching circuit 19, which are shown in FIG. 1. In such cases, the effects of restricting the DC drift phenomenon can be obtained.

A third embodiment of the electro-optic optical modulating apparatus in accordance with the present invention will be described hereinbelow with reference to FIG. 9.

Figure 9:
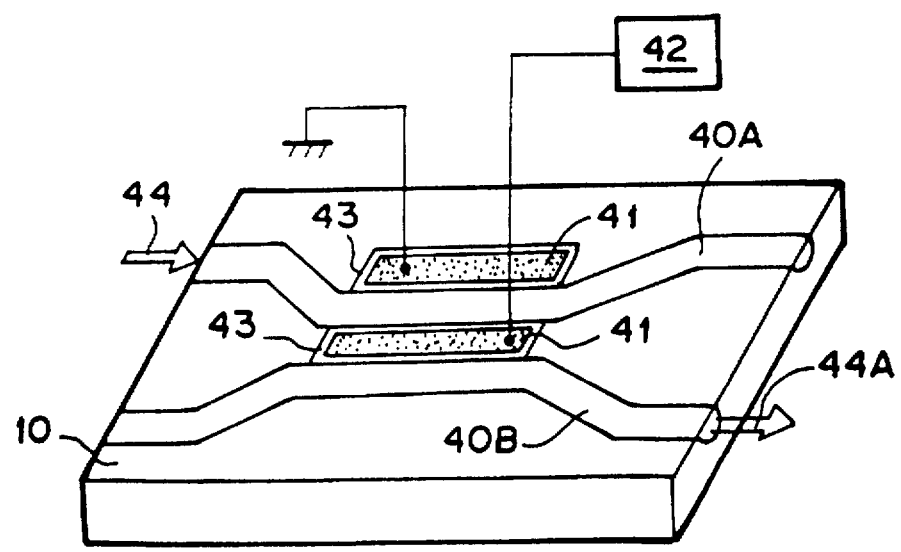
FIG. 9 is a perspective view showing a third embodiment of the electro-optic optical modulating apparatus in accordance with the present invention.

As illustrated in FIG. 9, the electro-optic optical modulating apparatus comprises an MgO-doped LiNbO₃ substrate 10 and two channel optical waveguides 40A, 40B, which are formed on the LiNbO₃ substrate 10 and constitute a directional coupler. The electro-optic optical modulating apparatus also comprises a pair of flat plate-shaped electrodes 41, 41, which are formed on the substrate 10 so as to flank the channel optical waveguide 40A. The electro-optic optical modulating apparatus further comprises a modulation driving circuit 42, which applies a predetermined voltage across the flat plate-shaped electrodes 41, 41. A buffer layer 43, which is constituted of an SiO₂ film, is located between the flat plate-shaped electrodes 41, 41 and the substrate 10.

In the third embodiment of FIG. 9, an entry optical wave 44 enters the channel optical waveguide 40A and is guided through the channel optical waveguide 40A. At the position, at which the two optical waveguides 40A and 40B become close to each other, the guided optical wave is transferred to the channel optical waveguide 40B. Thereafter, the optical wave is guided through the channel optical waveguide 40B and is radiated as a radiated optical wave 44A from the optical waveguide 40B.

When the voltage is applied across the electrodes 41, 41 and to the channel optical waveguide 40A, the refractive index of the channel optical waveguide 40A changes. As a result, the degree of transfer of the guided optical wave from the optical waveguide 40A to the optical waveguide 40B changes. Therefore, the intensity of the radiated optical wave 44A is modulated in accordance with the application of the voltage.

In the third embodiment, basically, the modulation driving circuit 42 may be constituted of the generator 16, the double balanced mixer 17, the amplifier 18, and the impedance matching circuit 19, which are shown in FIG. 1. In such cases, the effects of restricting the DC drift phenomenon can be obtained.

The electro-optic optical modulating apparatus in accordance with the present invention is not limited to the electro-optic optical modulating apparatus having the proton-exchange optical waveguide described above and is also applicable to an electro-optic optical modulating apparatus, which has an optical waveguide obtained by carrying out a proton exchange process and then carrying out an annealing process, an electro-optic optical modulating apparatus, which has a Ti-diffusion optical waveguide, and the like.

Also, the substrate of the optical waveguide is not limited to the MgO-doped LiNbO₃ substrate and may be an LiNbO₃ substrate, a LiTaO₃ substrate, an MgO-doped LiTaO₃ substrate, or the like.

Further, the means for modulating the amplitude of the radio-frequency voltage is not limited to the double balanced mixer 17 and may be a means for modulating an alternating current with a PIN diode, a means for generating a modulating optical wave with a digital process, or the like.

What is claimed is:

1. An electro-optic optical modulating apparatus comprising:
   i) an optical waveguide having electro-optic effects for guiding an optical signal, said optical signal bearing signal information,
   ii) at least one pair of electrodes located in the vicinity of the optical waveguide,
   iii) a driving circuit which applies an alternating voltage to the electrodes to provide drift compensation, wherein the frequency of said alternating voltage is higher than a frequency of said optical signal; and
   iv) a modulating circuit, which modulates the alternating voltage in accordance with a predetermined input signal to provide said optical signal to be guided in said waveguide.

2. An apparatus as defined in claim 1 wherein the electrodes are grating-shaped electrodes.

3. An apparatus as defined in claim 1 wherein the electrodes are flat plate-shaped electrodes.

4. An apparatus as defined in claim 1 wherein an optical wave, which is fed into the optical waveguide, is a laser beam.

5. An electro-optic optical modulating apparatus comprising:
   i) an optical waveguide having electro-optic effects for guiding an optical signal, said optical signal bearing signal information,
   ii) at least one pair of electrodes located in the vicinity of the optical waveguide,
   iii) a driving circuit which applies an alternating voltage to the electrodes to provide drift compensation, wherein the frequency of said alternating voltage is higher than a frequency of said optical signal; and
   iv) a modulating circuit, which modulates the alternating voltage in accordance with a predetermined input signal to provide said optical signal to be guided in said waveguide, wherein said alternating voltage is a rectangular voltage.

* * * * *